United States Patent [19]
Sakurai et al.

[11] Patent Number: 5,432,414
[45] Date of Patent: Jul. 11, 1995

[54] SENSORLESS SPINDLE MOTOR CONTROL APPARATUS

[75] Inventors: Tetsuji Sakurai; Katsuhiko Kaida, both of Tokyo, Japan

[73] Assignee: Kabushiki Kaisha Toshiba, Kawasaki, Japan

[21] Appl. No.: 251,645

[22] Filed: May 31, 1994

Related U.S. Application Data

[63] Continuation of Ser. No. 38,705, Mar. 29, 1993, abandoned.

[30] Foreign Application Priority Data

Mar. 30, 1992 [JP] Japan ................. 4-071983

[51] Int. Cl.⁶ ............................................. H02P 6/02
[52] U.S. Cl. ...................... 318/254; 318/439; 318/138; 318/721
[58] Field of Search ............... 318/254, 138, 439, 721, 318/560

[56] References Cited

U.S. PATENT DOCUMENTS

| | | | |
|---|---|---|---|
| 4,169,990 | 10/1979 | Lerdman | 318/138 |
| 4,642,537 | 2/1987 | Young | 318/254 |
| 4,928,043 | 5/1990 | Plunkett | 318/254 |
| 5,017,845 | 5/1991 | Larobdante et al. | 318/138 |
| 5,036,264 | 7/1991 | Ueki | 318/254 |
| 5,166,583 | 11/1992 | Min et al. | 318/254 |
| 5,182,499 | 1/1993 | Inaji et al. | 318/254 |
| 5,202,612 | 4/1993 | Yoshida et al. | 318/138 |

*Primary Examiner*—John W. Cabeca
*Attorney, Agent, or Firm*—Finnegan, Henderson, Farabow, Garrett & Dunner

[57] ABSTRACT

When a sensorless spindle motor having a rotor and a plurality of coils is started, a CPU outputs phase control signals to an excitation phase switching circuit to forcibly rotate the rotor. The CPU detects based on rotor position signals from a rotor position detecting circuit whether or not the rotor is rotated in the forced rotation. As a result, when the rotor is not rotated, the CPU retries the forced rotation. In each retried forced rotation, the CPU decreases the rotational speed of an excitation phase of each coil. The CPU may also execute the forced rotation after the rotor is aligned to an arbitrary position. When the rotor is not rotated in the forced rotation, the CPU retries the forced rotation. In each retried forced rotation, the CPU changes the excitation start phase.

12 Claims, 5 Drawing Sheets

SENSORLESS SPINDLE MOTOR CONTROL APPARATUS

This application is a continuation of application Ser. No. 08/038,705, filed Mar. 29, 1993, now abandoned.

BACKGROUND OF THE INVENTION

1. Field of the Invention

The present invention relates to a sensorless spindle motor control apparatus used in, e.g., a magnetic disk apparatus.

2. Description of the Related Art

A compact magnetic disk apparatus adopts a sensorless spindle motor as a motor for rotating a recording medium. The sensorless spindle motor has no sensor for detecting the rotor position. Therefore, in the magnetic disk apparatus using the sensorless spindle motor, the rotor position is detected on the basis of a counter electromotive voltage generated in each coil.

No counter electromotive voltage is generated unless the rotor is rotated. For this reason, when the spindle motor is started, the phases are sequentially to rotate the rotor, and the initially excited phase is not dependent on the rotational position of the rotor to rotate the rotor. This rotation is called a forced rotation.

In the forced rotation mode, if the length of time for sequentially exciting the phases is proper, the rotor is rotated. However, if the time for sequentially exciting the phases is too short, an out-of-phase state occurs, and the rotor is not rotated. Conversely, even though the length of time for sequentially exciting the phases is proper, if the load on the rotor is increased for any cause, the the length of time for sequentially exciting the phases becomes improper, and the rotor is not rotated. In this manner, when the length of time for sequentially exciting the phases is not proper, the out-of-phase state cannot be removed even after the forced rotation is retried any number of times, and the motor cannot be started.

Upon starting of the spindle motor, when the phases of the coils are excited in turn, the rotor may be attracted in a direction opposite to a normal rotational direction depending on the initial rotor position, and may be kept rotated in the reverse direction. In general, upon execution of the forced rotation, one of the phases of the coils is excited to align the rotor at an arbitrary position. This operation is called alignment excitation.

FIG. 10 shows the relationship between the rotor position and the torque upon starting of a motor. The ordinate corresponds to a torque axis, and a relative value is plotted when the maximum value of a torque to be generated is assumed to be "1". The abscissa corresponds to an angle axis, and an electrical degree between an excitation phase and the rotor when one period of a change in phase is assumed to be 360° is plotted. A torque characteristics curve a represents the relationship between the relative positions between the excitation phase and the rotor and the generated torque.

As can be apparent from FIG. 10, when the electrical degree falls within a range of 0°±30° and a range of 180°±30°, a torque only ½ the peak value is generated. Normally, the motor can be started even by the ½ torque without posing any problem. However, when the static friction of the rotor, e.g., the static friction between a magnetic disk and a magnetic head, is considerably increased due to, e.g., aging of the apparatus, the rotor cannot be rotated. More specifically, even when the forced rotation is retried any number of times, if the phase to be excited is always the same, a sufficient torque cannot be obtained, and the motor cannot be started.

SUMMARY OF THE INVENTION

It is an object of the present invention to provide a sensorless spindle motor control apparatus which can start a motor by a retry operation even when the start load on a rotor is considerably increased due to variations of individual motors or aging.

It is another object of the present invention to provide a sensorless spindle motor control apparatus which can apply a maximum torque to a rotor regardless of the start rotor position, and can reliably start a motor even when the static friction of the rotor is large.

A sensorless spindle motor control apparatus according to the present invention comprises a sensorless spindle motor having a rotor and a plurality of coils, forced rotation means for, when the spindle motor is started, performing a forced rotation of the rotor, rotation detecting means for detecting whether or not the rotor is rotated, retry means for, when the rotation detecting means detects in the forced rotation that the rotor is not rotated, causing the forced rotation means to retry the forced rotation, and control means for controlling the forced rotation means to to change a length of time in which the phases of each of the coils for every retry of the forced rotation.

Also, a sensorless spindle motor control apparatus according to the present invention comprises a sensorless spindle motor having a rotor and a plurality of coils, forced rotation means for, when the spindle motor is started, aligning the rotor to an arbitrary position, and thereafter, performing a forced rotation of the rotor, rotation detecting means for detecting whether or not the rotor is rotated, retry means for, when the rotation detecting means detects in the forced rotation that the rotor is not rotated, causing the forced rotation means to retry the forced rotation, and control means for controlling the forced rotation means to change an initially excited phase of each of said coils upon rotation of the rotor for every retry of the forced rotation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A sensorless spindle motor control apparatus according to the present invention will be described hereinafter with reference to the accompanying drawings.

(First Embodiment)

Figure 1:
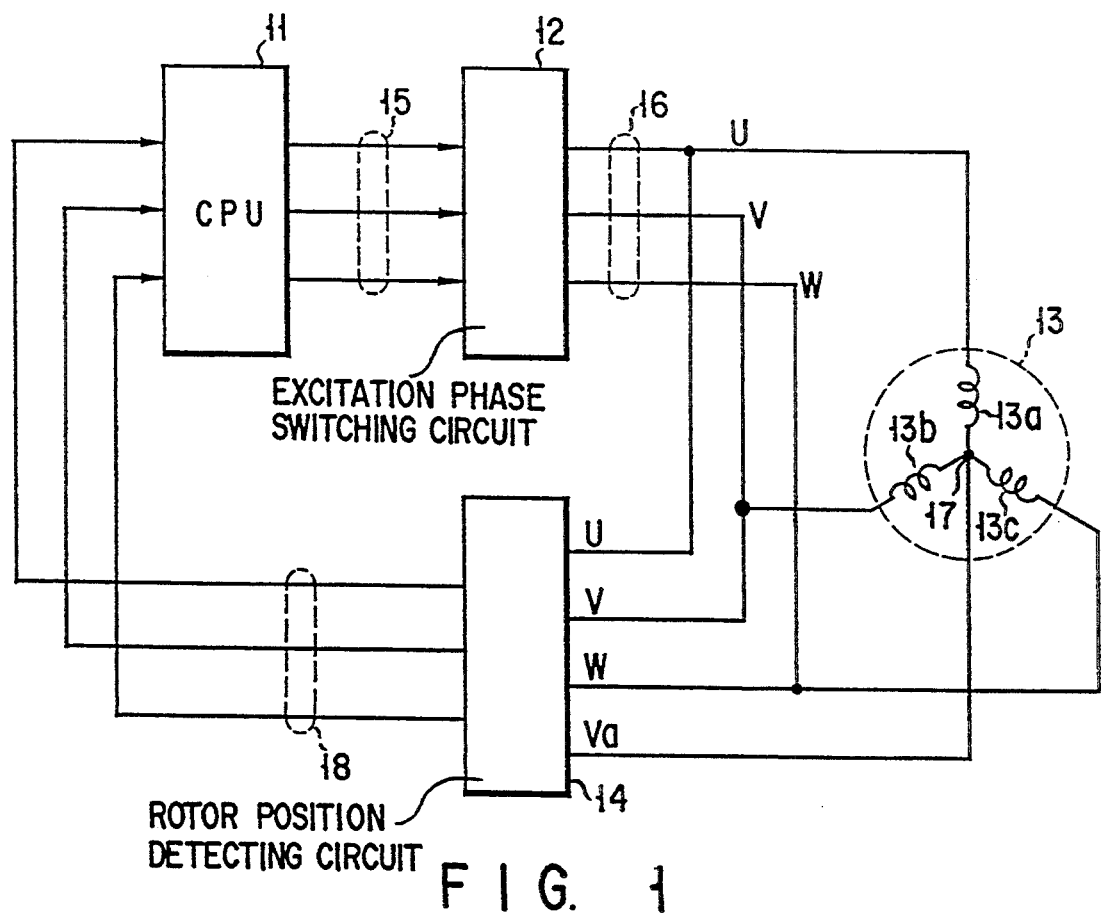
FIG. 1 is a block diagram showing an arrangement of a sensorless spindle motor control apparatus according to the first embodiment of the present invention.

FIG. 1 is a block diagram showing the first embodiment of the present invention. In FIG. 1, the sensorless spindle motor control apparatus of the present invention comprises a CPU 11, an excitation phase switching circuit 12, a sensorless spindle motor 13, and a rotor position detecting circuit 14.

Figure 6:
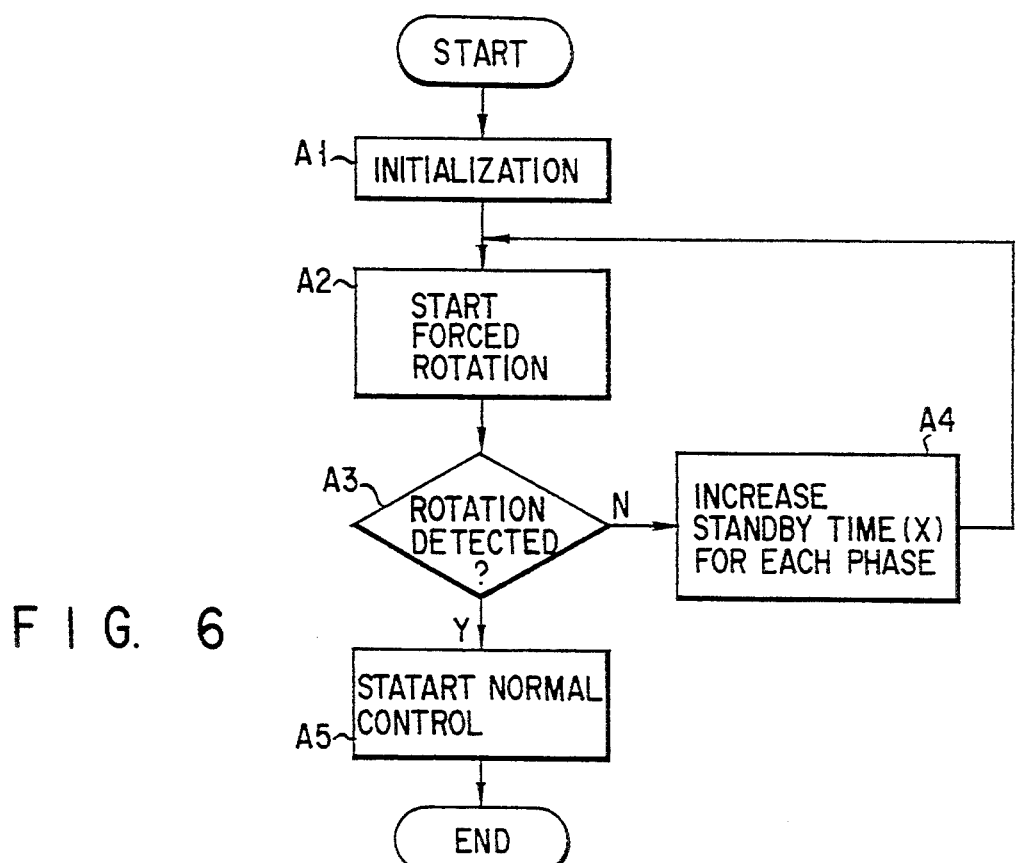
FIG. 6 is a flow chart showing a motor start control operation in the first embodiment of the present invention.
Figure 7:
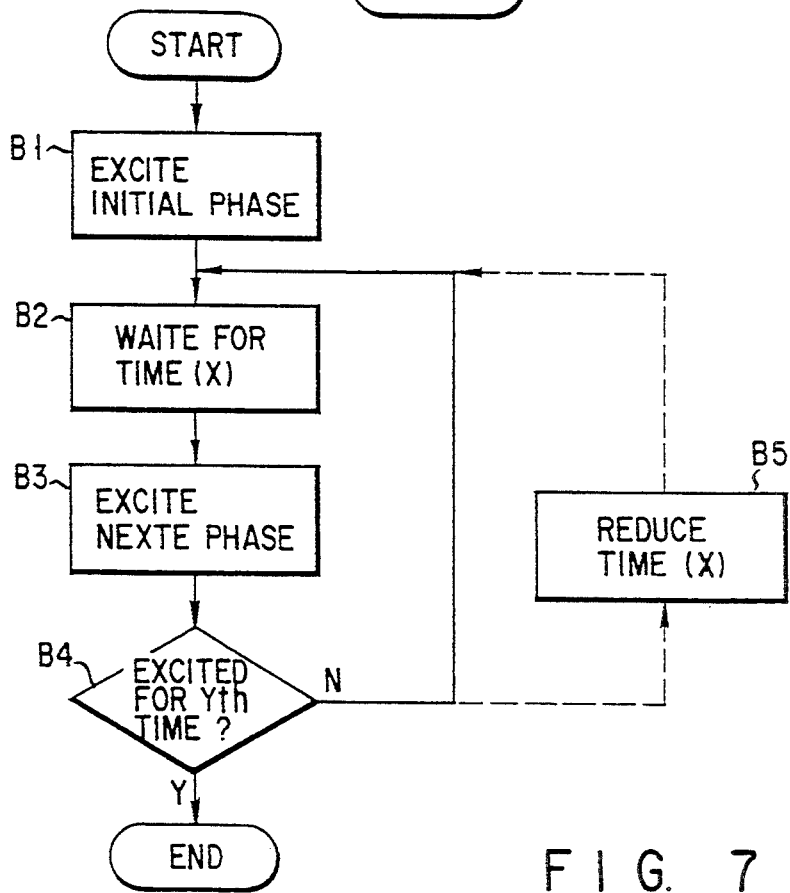
FIG. 7 is a flow chart showing the details of the forced rotation step in FIG. 6.

The CPU 11 controls the entire apparatus of this embodiment, and executes motor control, as shown in FIGS. 6 and 7. The CPU 11 outputs three-phase phase control signals 15 for rotating the spindle motor 13 to the excitation phase switching circuit 12. The phase control signals 15 are output according to a start protocol in a start mode, and are output based on rotor position signals 18 from the rotor position detecting circuit 14 in a steady rotation mode.

Figure 2:
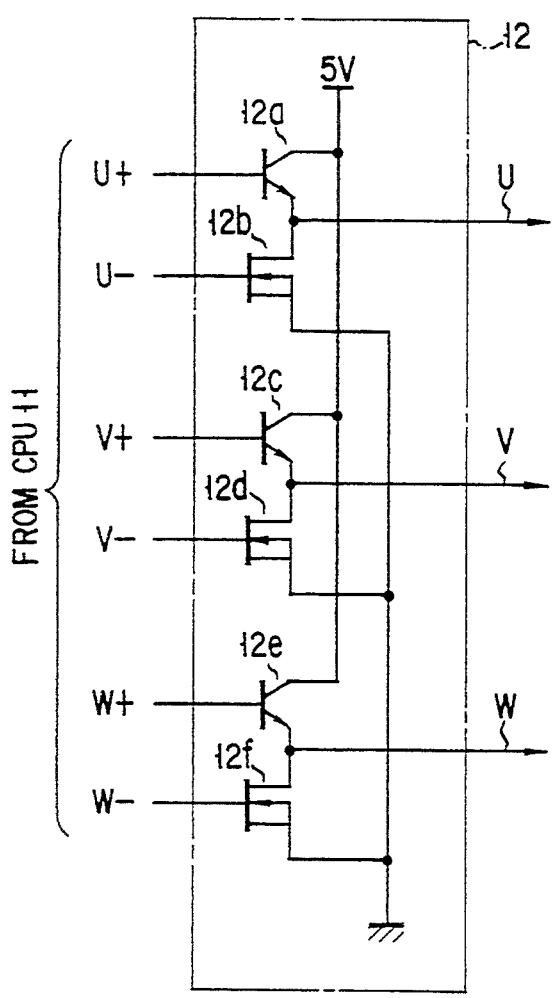
FIG. 2 is a circuit diagram showing an arrangement of an excitation phase switching circuit shown in FIG. 1.

The excitation phase switching circuit 12 switches the excitation phase of the spindle motor 13 on the basis of the phase control signals 15 from the CPU 11. The excitation phase switching circuit 12 has transistors 12a, 12c, and 12e, and field effect transistors (FETs) 12b, 12d, and 12f, as shown in FIG. 2. The excitation phase switching circuit 12 generates three-phase motor driving signals 16 on the basis of the phase control signals 15, and outputs the generated signals to the spindle motor 13 and the rotor position detecting circuit 14.

Figure 3:
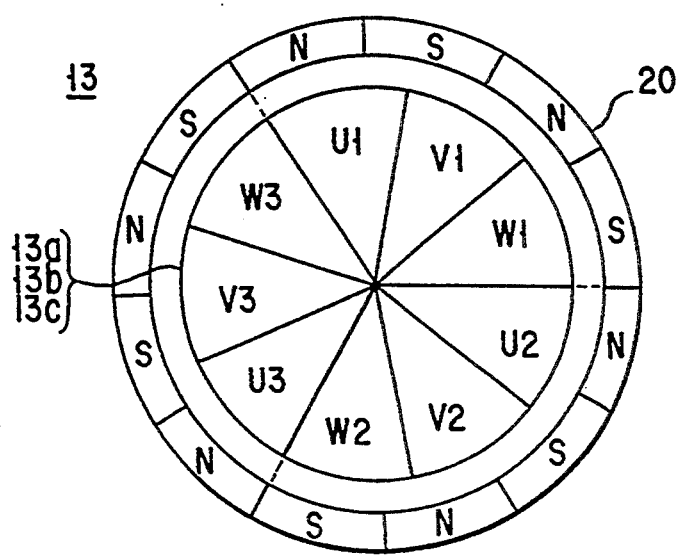
FIG. 3 is a view showing an arrangement of a spindle motor shown in FIG. 1.
Figure 4:
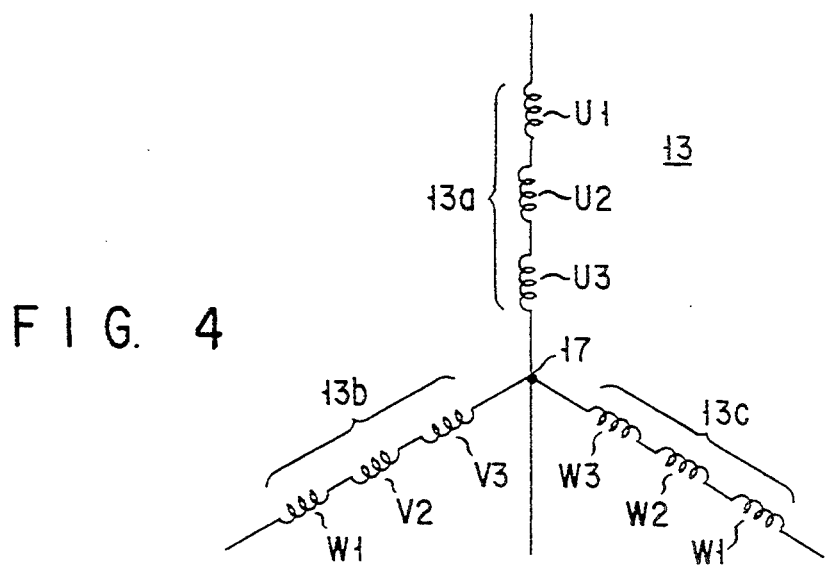
FIG. 4 is a circuit diagram showing an arrangement of coils of the spindle motor.

The spindle motor 13 is a motor for rotating a recording medium (disk; not shown). As shown in FIG. 3, the spindle motor 13 has a rotor 20 and coils 13a to 13c. The rotor 20 has 12 magnetic poles. Also, as shown in FIG. 4, the coil 13a has coils U1, U2, and U3, the coil 13b has coils v1, v2, and v3, and the coil 13c has coils w1, w2, and W3. The coils 13a, 13b, and 13c are driven by the motor driving signals 16, and generate a magnetic field for the rotor 20. Upon generation of the magnetic field, the rotor 20 is rotated.

When the rotor 20 is rotated, counter electromotive voltages are generated in the coils 13a, 13b, and 13c. The counter electromotive voltages are supplied to the rotor position detecting circuit 14 while being superposed on the motor driving signals 16. At this time, a voltage Va at a common terminal 17 of the coils 13a, 13b, and 13c is also supplied to the rotor position detecting circuit 14.

Figure 5:
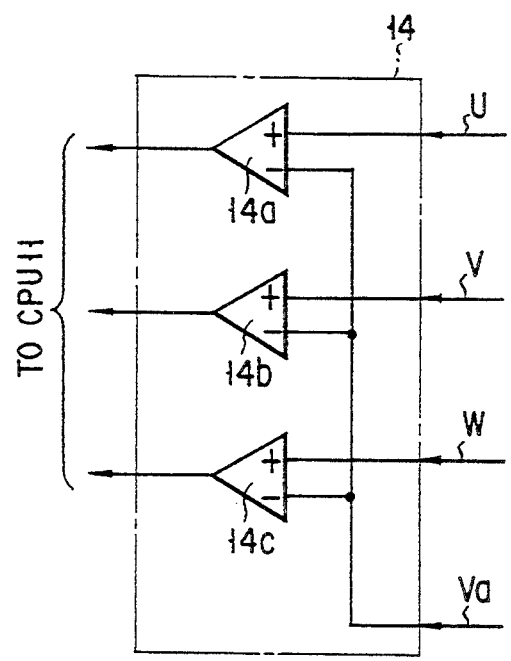
FIG. 5 is a circuit diagram showing an arrangement of a rotor position detecting circuit shown in FIG. 1.

The rotor position detecting circuit 14 has comparators 14a, 14b, and 14c, as shown in FIG. 5. The rotor position detecting circuit 14 compares the counter electromotive voltages U, v, and w from the coils 13a, 13b, and 13c with the voltage va from the common terminal 17, and outputs the comparison results to the CPU 11 as the rotor position signals 18. The CPU 11 determines the position of the rotor 20 on the basis of the rotor position signals 18 from the rotor position detecting circuit 14, and generates the phase control signals 15.

The operation of the first embodiment will be described below with reference to the flow charts shown in FIGS. 6 and 7.

FIG. 6 is a flow chart showing a motor start protocol of the CPU 11. The CPU 11 initially determines the length of time for sequentially exciting the phases of the coils 13a, 13b, and 13c of the spindle motor (step A1), and outputs the phase control signals 15 according to the initial setting values to the excitation phase switching circuit 12.

The excitation phase switching circuit 12 switches the excitation phases at the length of time determined in accordance with the phase control signals 15, and generates the three-phase, i.e., U, v, and W motor driving signals 16, thus performing a forced rotation of the spindle motor 13 (step A2). The forced rotation means that the rotor 20 is forcibly rotated so as to cause the coils 13a, 13b, and 13c to generate counter electromotive voltages upon detection of the rotor position of the spindle motor 13.

FIG. 7 shows the forced rotation processing of the CPU 11.

First, an initial phase is excited (step B1). In this case, an arbitrary or specific one phase is excited. After the initial phase is excited, the control waits for an elapse of a time (X) (step B2). More specifically, the control waits for an elapse of "an excitation time per phase 2 constant (or variable)" without changing the phase. After the elapse of the standby time (X), the next phase is excited (step B3).

In this case, the number (Y) of times of excitation of each phase is set in advance in the forced rotation mode, and it is checked if the number of times of excitation has reached (Y) (step B4). If N (NO) in step B4, the flow returns to step B2, and the control waits for the elapse of the standby time. Thereafter, the next phase is excited. The operations in steps B2 to B4 are repeated, and if it is determined in step B4 that the number of times of phase excitation has reached Y, the forced rotation operation is ended.

Note that the forced rotation processing may have step B5 of shortening the standby time (X). In the processing of step B5, the forced rotation time per phase is shortened without causing an out-of-phase state of the rotor 20 so as to perform efficient acceleration when the flow returns from step B4 to step B2.

When the rotor 20 is rotated by the above-mentioned forced rotation, counter electromotive voltages are generated in the coils 13a, 13b, and 13c to have a 120° phase difference between each two adjacent coils. The counter electromotive voltages (U, V, W) are superposed on the driving signals 16, and are supplied to the rotor position detecting circuit 14. The rotor position detecting circuit 14 also receives the voltage va generated at the common terminal 17 of the spindle motor 13. The rotor position detecting circuit 14 compares the common terminal voltage va and the counter electromotive voltages from the coils 13a, 13b, and 13c, and outputs the rotor position signals 18 to the CPU 11.

The CPU 11 checks based on the rotor position signals 18 if the rotor 20 is rotated (step A3). In this case, if the length of time for sequentially excitation exciting the phases is proper, the rotor 20 is rotated. If the CPU 11 detects based on the rotor position signals 18 that the rotor 20 is rotated, it executes a normal control rotation operation (step A5). On the other hand, if the length of time for sequentially exciting the phases becomes improper due to, e.g., a variation in load, and the rotor 20 is not rotated, the CPU 11 retries the forced rotation.

In the first embodiment, the standby time (X) upon excitation of the phases in turn in the forced rotation mode is prolonged for every forced rotation retrial, thus consequently shortening the time in which the phases are the sequentially excited.

More specifically, as shown in FIG. 6, if the CPU 11 detects based on the rotor position signals 18 that the rotor 20 is not rotated (step A3), it prolongs the standby time (X) (step A4). The CPU 11 outputs the phase control signals 15 according to the new setting contents to the excitation phase switching circuit 12, thus re-executing the forced rotation (step A2). When the rotor 20 is not rotated by this forced rotation, the CPU 11 further prolongs the standby time (X) to retry the forced rotation.

In this manner, every time the forced rotation is unsuccessful, the CPU 11 prolongs the standby time (X) per phase in the forced rotation mode to shorten the time in which the phases are sequentially excited. In this process, the length of time for sequentially exciting the phases is made to correspond to a proper rotational speed, and the spindle motor 13 can be reliably started. Thereafter, the CPU 11 starts the normal control rotation operation (step A5) to accelerate the rotor 20 to a steady speed, and thereafter, maintains the steady speed.

As described above, according to the first embodiment of the present invention, when the forced rotation is unsuccessful, since the forced rotation is retried while sequentially shortening the time in which the phases are sequentially excited, the rotational speed can always be caused to coincide with a proper rotational speed, and the spindle motor 13 can be reliably started.

(Second Embodiment)

The second embodiment of the present invention will be described below with reference to FIGS. 8 and 9.

The second embodiment has as its object to reliably start the spindle motor 13 by rotating the rotor 20 by a maximum torque regardless of the start position of the rotor 20.

Figure 8:
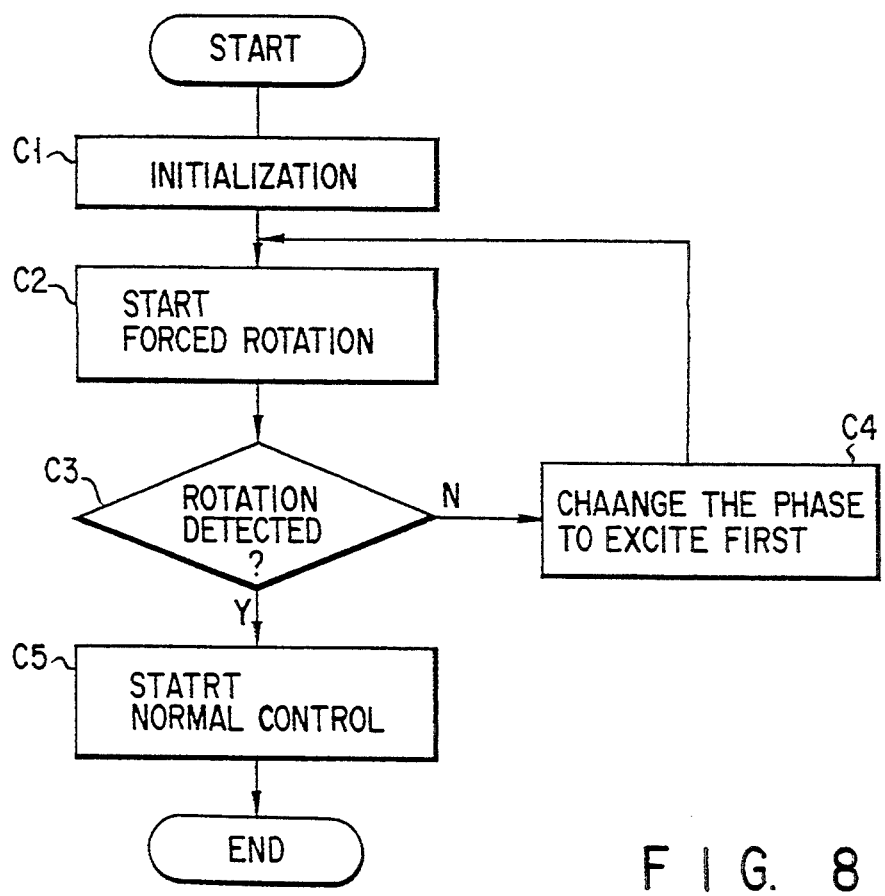
FIG. 8 is a flow chart showing a motor start control operation in the second embodiment of the present invention.

In the circuit arrangement shown in FIG. 1, the CPU 11 executes start processing shown in the flow chart of FIG. 8. Upon reception of a start command, the CPU 11 performs initialization (step C1), and outputs the phase control signals 15 to the excitation phase switching circuit 12. The excitation phase switching circuit 12 switches the excitation phases at a speed corresponding to the phase control signals 15, and generates the three-phase, i.e., U, V, and W motor driving signals 16, thus performing a forced rotation of the spindle motor 13 (step C2).

Figure 9:
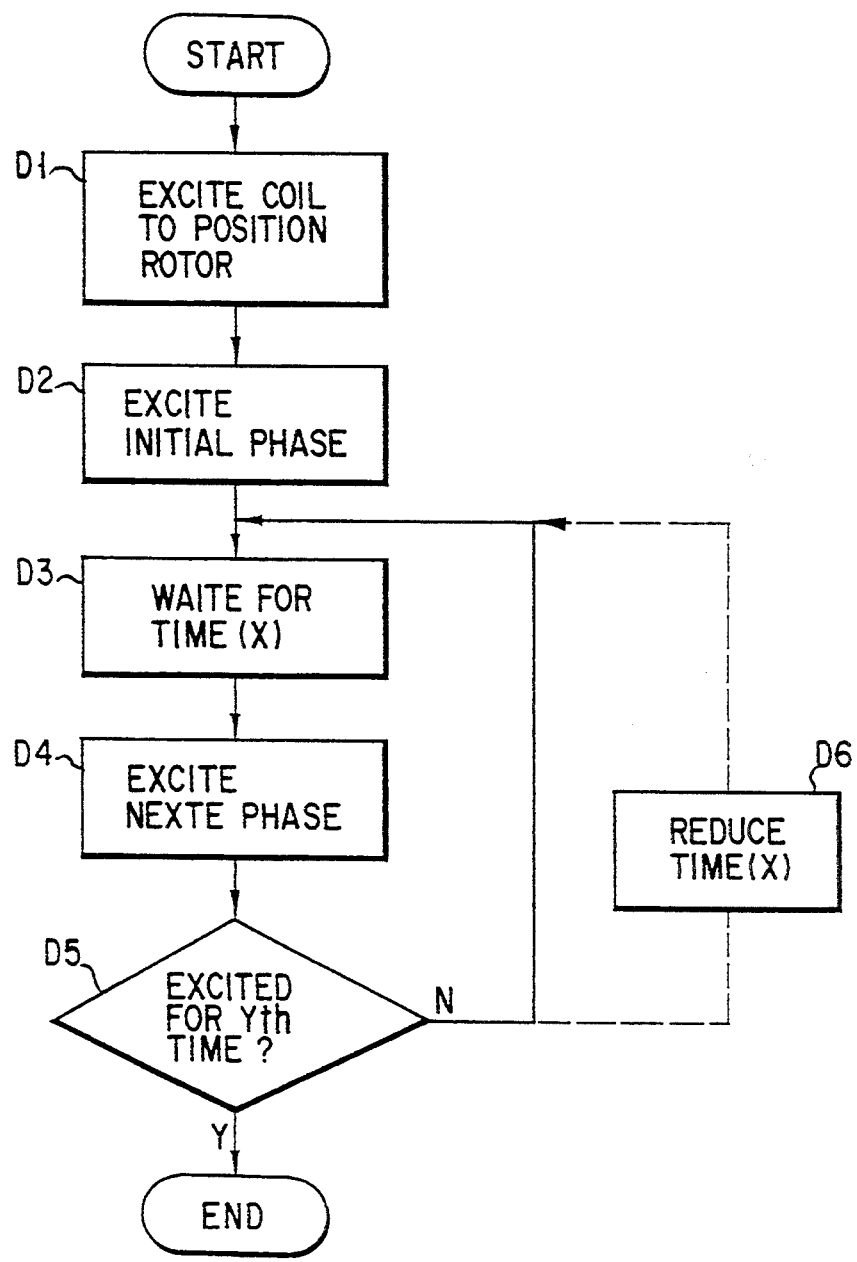
FIG. 9 is a flow chart showing the details of the forced rotation step in FIG. 8.

FIG. 9 shows the forced rotation processing of the CPU 11.

Since the start position of the rotor 20 is unknown, one phase of the coils 13a, 13b, and 13c is excited to align the rotor 20 at an arbitrary position (step D1). At this time, the controls waits for an elapse of a predetermined period of time until the vibration of the rotor 20 is canceled. After the elapse of the predetermined period time, a phase next to the phase subjected to the alignment excitation is excited to rotate the rotor 20 (step D2). Then, the control waits for an elapse of an initially set time (X) (step D3). The standby time (X) determines the length of time for sequentially exciting the phases, and is set to be a value which does not cause an out-of-phase state of the rotor 20. After the elapse of the standby time (X), the next phase is excited (step D4).

At this time, it is checked if the number of times of phase excitation has reached the predetermined number Y of forced rotation phases (step D5). If N in step D5, the flow returns to step D3, and the control waits for the elapse of the standby time. Thereafter, the next phase is excited. The operations in steps D3 to D5 are repeated, and if it is detected in step D5 that the number of times of phase excitation has reached Y, the forced rotation is ended.

Note that the forced rotation processing may have step D6 of shortening the standby time (X). In the processing of step D6, the forced rotation time per phase is shortened without causing an out-of-phase state of the rotor 20 so as to perform efficient acceleration when the flow returns from step D5 to step D3.

When the rotor 20 is rotated by the above-mentioned forced rotation, counter electromotive voltages are generated in the coils 13a, 13b, and 13c to have a 120° phase difference between each two adjacent coils. The counter electromotive voltages (U, V, W) are superposed on the driving signals 16, and are supplied to the rotor position detecting circuit 14. The rotor position detecting circuit 14 also receives the voltage Va generated at the common terminal 17 of the spindle motor 13. The rotor position detecting circuit 14 compares the common terminal voltage Va and the counter electromotive voltages from the coils 13a, 13b, and 13c, and outputs the rotor position signals 18 to the CPU 11.

The CPU 11 checks based on the rotor position signals 18 if the rotor 20 is rotated (step C3). When the CPU 11 detects that the rotor 20 is rotated, it executes a normal control rotation operation (step C5). On the other hand, when a sufficient torque cannot be obtained due to, e.g., an increase in static friction, and the rotor 20 cannot be rotated, the CPU 11 retries the forced rotation.

The second embodiment is characterized in that a phase for initially exciting each coil in the forced rotation mode is changed for every forced rotation retrial.

More specifically, as shown in FIG. 8, if the CPU 11 detects based on the rotor position signals 18 that the rotor 20 is not rotated (step C3), it changes the start phase of the forced rotation (step C4). More specifically, the CPU 11 sets a new phase for initially exciting each of the coils 13a, 13b, and 13c in the forced rotation mode. The CPU 11 outputs the phase control signals 15 according to the new setting contents to the excitation phase switching circuit 12, thus reexecuting the forced rotation (step C2). When the rotor 20 is not rotated by this forced rotation, the CPU 11 changes the start phase again, and retries the forced rotation.

Figure 10:
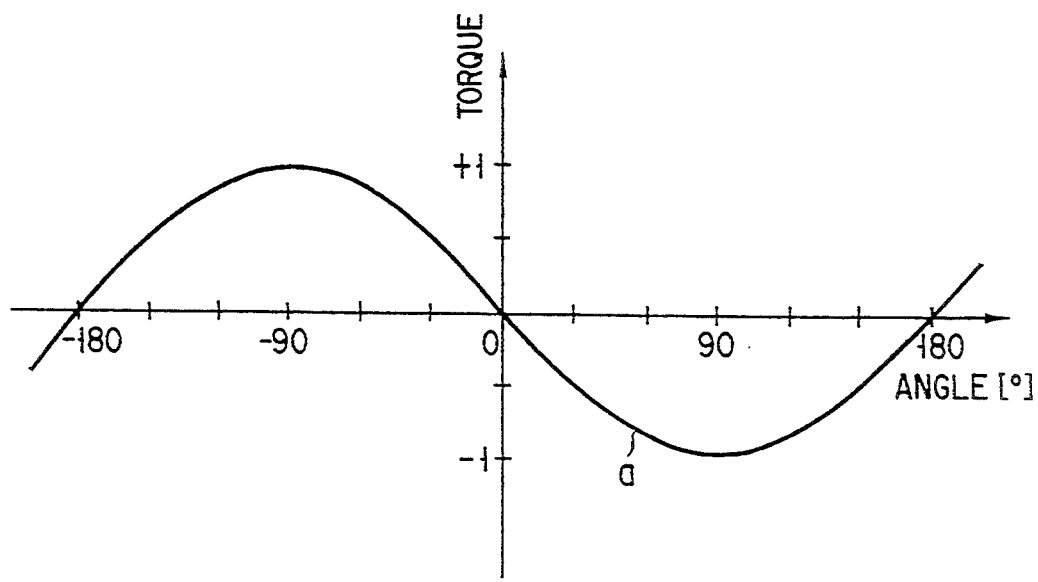
FIG. 10 is a graph showing the relationship between the rotor position and the torque in a spindle motor.

In this manner, every time the forced rotation is unsuccessful, the CPU 11 sequentially changes the excitation start phase. Thus, as shown in, e.g., FIG. 10, even when the excitation start phase is located at a position of 0°±30° or 180°35 30°, and the torque is too small to start the motor, the maximum torque can be applied to the rotor 20 by changing the excitation start phase. Thus, the spindle motor 13 can be reliably started.

As described above, according to the second embodiment of the present invention, when the forced rotation is unsuccessful, since the excitation start phase is sequentially changed, the maximum torque can be applied to the rotor regardless of the position of the rotor 20. Therefore, the spindle motor 13 can be reliably started even when the static friction of the rotor 20 is large.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus comprising:
    a sensorless spindle motor having a rotor and a plurality of coils;
    forced rotation means for performing a forced rotation of said rotor;
    rotation detecting means for detecting whether or not said rotor is rotated;
    retry means for, when said rotation detecting means detects in the forced rotation that the rotor is not rotated, causing said forced rotation means to retry the forced rotation; and
    control means for controlling said forced rotation means to change a length of time in which the phases of each of said coils are excited for every retry of the forced rotation.

2. An apparatus according to claim 1, wherein said forced rotation means comprises excitation means for exciting each of said coils to rotate said rotor, and rotates said rotor by sequentially exciting each phase of each of said coils by said excitation means.

3. An apparatus according to claim 2, wherein said control means controls said forced rotation means to prolong a standby time per phase upon excitation of each phase of each of said coils by said excitation means for every retry of the forced rotation.

4. An apparatus according to claim 1, wherein said rotation detecting means comprises rotor position detecting means for detecting a position of said rotor, and detects based on a detection signal from said rotor position detecting means whether or not said rotor is rotated.

5. An apparatus according to claim 4, wherein said rotor position detecting means detects the position of said rotor on the basis of a counter electromotive voltage generated in each of said coils.

6. An apparatus comprising:
    a sensorless spindle motor having a rotor and a plurality of coils;
    forced rotation means for aligning said rotor to an arbitrary position, and thereafter, performing a forced rotation of said rotor;
    rotation detecting means for detecting whether or not said rotor is rotated;
    retry means for, when said rotation detecting means detects in the forced rotation that the rotor is not rotated, causing said forced rotation means to retry the forced rotation; and control means for controlling said forced rotation means to change an initially-excited phase of each of said coils upon rotation of said rotor for every retry of the forced rotation.

7. An apparatus according to claim 6, wherein said forced rotation means comprises excitation means for exciting each of said coils to rotate said rotor, aligns said rotor by exciting one of the phases of each of said coils using said excitation means, and then rotates said rotor by sequentially exciting each phase of each of said coils.

8. An apparatus according to claim 7, wherein said control means controls said forced rotation means to change a phase with which said excitation means excites each of said coils first for every retrial of the forced rotation.

9. An apparatus according to claim 6, wherein said rotation detecting means comprises rotor position detecting means for detecting a position of said rotor, and detects based on a detection signal from said rotor position detecting means whether or not said rotor is rotated.

10. An apparatus according to claim 9, wherein said rotor position detecting means detects the position of said rotor on the basis of a counter electromotive voltage generated in each of said coils.

11. A method of driving a sensorless spindle motor having a rotor and a plurality of coils, comprising the steps of:
    performing a forced rotation of said rotor:
    detecting whether or not said rotor is rotated;
    causing said forced rotation means to retry the forced rotation when said rotation detecting means detects in the forced rotation that the rotor is not rotated; and
    controlling said forced rotation means to change a length of time in which the phases of each of said coils are excited for every retry of the forced rotation.

12. A method of driving a sensorless spindle motor having a rotor and a plurality of coils, comprising the steps of:
    aligning said rotor to an arbitrary position, and thereafter, performing a forced rotation of said rotor;
    detecting whether or not said rotor is rotated;
    causing said forced rotation means to retry the forced rotation when said rotation detecting means detects in the forced rotation that the rotor is not rotated; and
    controlling said forced rotation means to change an initially-excited phase of each of said coils upon rotation of said rotor for every retry of the forced rotation.

* * * * *

UNITED STATES PATENT AND TRADEMARK OFFICE
CERTIFICATE OF CORRECTION

PATENT NO.   : 5,432,414
DATED        : July 11, 1995
INVENTOR(S)  : Tetsuji SAKURAI et al It is certified that error appears in the above-indentified patent and that said Letters Patent is hereby corrected as shown below:

Abstract, item [57], LINES 10 & 11, "decreases the rotational speed of an excitation phase of each coil" should read --changes the length of time for sequentially exciting the phases--.

CLAIM 6, COLUMN 8, LINE 9, "control" SHOULD BEGIN A NEW LINE ON A "HANG" INDENT.

Signed and Sealed this

Twenty-third Day of July, 1996

Attest:

BRUCE LEHMAN

Attesting Officer

Commissioner of Patents and Trademarks